(12) United States Patent
Suzuki

(10) Patent No.: US 12,722,449 B2
(45) Date of Patent: Sep. 1, 2026

(54) SWITCHING DEVICE AND THERMAL MANAGEMENT SYSTEM

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 18/735,509

(22) Filed: Jun. 6, 2024

(65) Prior Publication Data

US 2025/0026172 A1 Jan. 23, 2025

(30) Foreign Application Priority Data

Jul. 19, 2023 (JP) ................................ 2023-117554

(51) Int. Cl.
*B60H 1/00* (2006.01)

(52) U.S. Cl.
CPC ..... *B60H 1/00485* (2013.01); *B60H 1/00392* (2013.01); *B60H 1/00885* (2013.01)

(58) Field of Classification Search
CPC ............ B60H 1/00485; B60H 1/00392; B60H 1/00885; B60H 1/00278; B60H 1/00385; B60H 1/00021; F25B 5/02; F25B 41/325; F25B 41/40; F25B 49/02
See application file for complete search history.

(56) References Cited

U.S. PATENT DOCUMENTS

| | | | | |
|---|---|---|---|---|
| 4,601,645 A * | 7/1986 | Schmitkons | ............ | F04C 13/00 261/84 |
| 2015/0101693 A1 | 4/2015 | Enomoto | | |
| 2021/0301691 A1 | 9/2021 | Hasegawa et al. | | |

FOREIGN PATENT DOCUMENTS

| | | | | |
|---|---|---|---|---|
| CN | 2198478 Y * | 5/1995 | | |
| CN | 100554742 C * | 10/2009 | ............. | F16K 31/04 |
| CN | 205707124 U * | 11/2016 | | |
| CN | 114834209 A * | 8/2022 | ............. | B60L 58/26 |
| CN | 217355670 U * | 9/2022 | | |
| JP | 2008157675 A * | 7/2008 | | |
| JP | 5131430 B2 * | 1/2013 | | |
| JP | 2013-238310 A | 11/2013 | | |
| JP | 2021-154767 A | 10/2021 | | |
| TW | 445348 B * | 7/2001 | ............ | F25B 31/026 |
| WO | WO-2022042974 A1 * | 3/2022 | ........... | F16K 31/535 |
| WO | WO-2023124882 A1 * | 7/2023 | ............ | F16K 11/087 |

* cited by examiner

*Primary Examiner* — Kun Kai Ma
(74) *Attorney, Agent, or Firm* — Oliff PLC

(57) ABSTRACT

The switching device includes a first five-way switching unit, a second five-way switching unit, and a drive unit. The first five-way switching unit includes a first switching plate, and the second five-way switching unit includes a second switching plate. The drive unit includes a first gear part capable of driving the first switching plate, a second gear part capable of driving the second switching plate, and a motor that drives the first gear part and the second gear part. The gear ratio of the first gear to the second gear is 2 or more.

2 Claims, 7 Drawing Sheets

1
O/C
PCU
ESU
T/A
R/T
ELECTRIC HEATER
BATTERY
EPR
EVAPORATOR
HEATER CORE
P1
P2
P3
P4
P5
P6
P7
P8
P9
P10
110
110a
110b
111
112
113
114
115
120
121
122
130
130a
130b
131
132
133
134
135
136
140
150
151
152
153
154
155
160
170
170a
170b
171
172
173
200
200a
210
220
230

SWITCHING DEVICE AND THERMAL MANAGEMENT SYSTEM

CROSS-REFERENCE TO RELATED APPLICATION

This application claims priority to Japanese Patent Application No. 2023-117554 filed on Jul. 19, 2023, incorporated herein by reference in its entirety.

BACKGROUND

1. Technical Field

The present disclosure relates to a switching device and a thermal management system.

2. Description of Related Art

For example, Japanese Unexamined Patent Application Publication No. 2021-154767 (JP 2021-154767 A) discloses a thermal management system including a first thermal circuit including a battery, a PCU, and the like, a second thermal circuit mainly having a function of cooling air in a vehicle cabin, and a third thermal circuit mainly having a function of warming the air in the vehicle cabin. Each circuit is provided with a switching valve for switching a flow path.

SUMMARY

In a thermal management circuit as described in JP 2021-154767 A, by providing a plurality of flow path switching units (switching valves, etc.), it is possible to drive the thermal management circuit in a plurality of modes. In order to increase the number of switchable modes, it is conceivable to drive the flow path switching units independently. As a result, the same number of drive units (such as motors) as the number of flow path switching units is required.

An object of the present disclosure is to provide a switching device and a thermal management system capable of securing the number of modes switchable by a single drive portion.

A switching device according to a first aspect of the present disclosure is a switching device that is able to be provided in a thermal management circuit. The switching device includes:

- a first five-way switching unit;
- a second five-way switching unit; and
- a drive unit that drives the first five-way switching unit and the second five-way switching unit.

The first five-way switching unit includes a first switching plate.

The second five-way switching unit includes a second switching plate.

The drive unit includes

- a first gear portion that is able to drive the first switching plate,
- a second gear portion that is able to drive the second switching plate, and
- a drive portion that drives the first gear portion and the second gear portion.

A gear ratio of the first gear portion to the second gear portion is two or more.

A thermal management system according to a second aspect of the present disclosure is a thermal management system provided in an electrical device. The thermal management system includes:

- the switching device according to the first aspect;
- a first flow path, a second flow path, a third flow path, and a fourth flow path each configured to allow a heat medium to flow through the flow path;
- a power storage device that exchanges heat with the heat medium flowing through the first flow path;
- a drive device that exchanges heat with the heat medium flowing through the second flow path and supplies a driving force to the electrical device;
- a radiator provided in the third flow path; and
- a chiller provided in the fourth flow path.

The first five-way switching unit and the second five-way switching unit in the switching device are able to switch a connection state between the first flow path, the second flow path, the third flow path, and the fourth flow path.

According to the present disclosure, it is possible to provide a switching device and a thermal management system capable of securing the number of modes that can be switched by a single drive portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
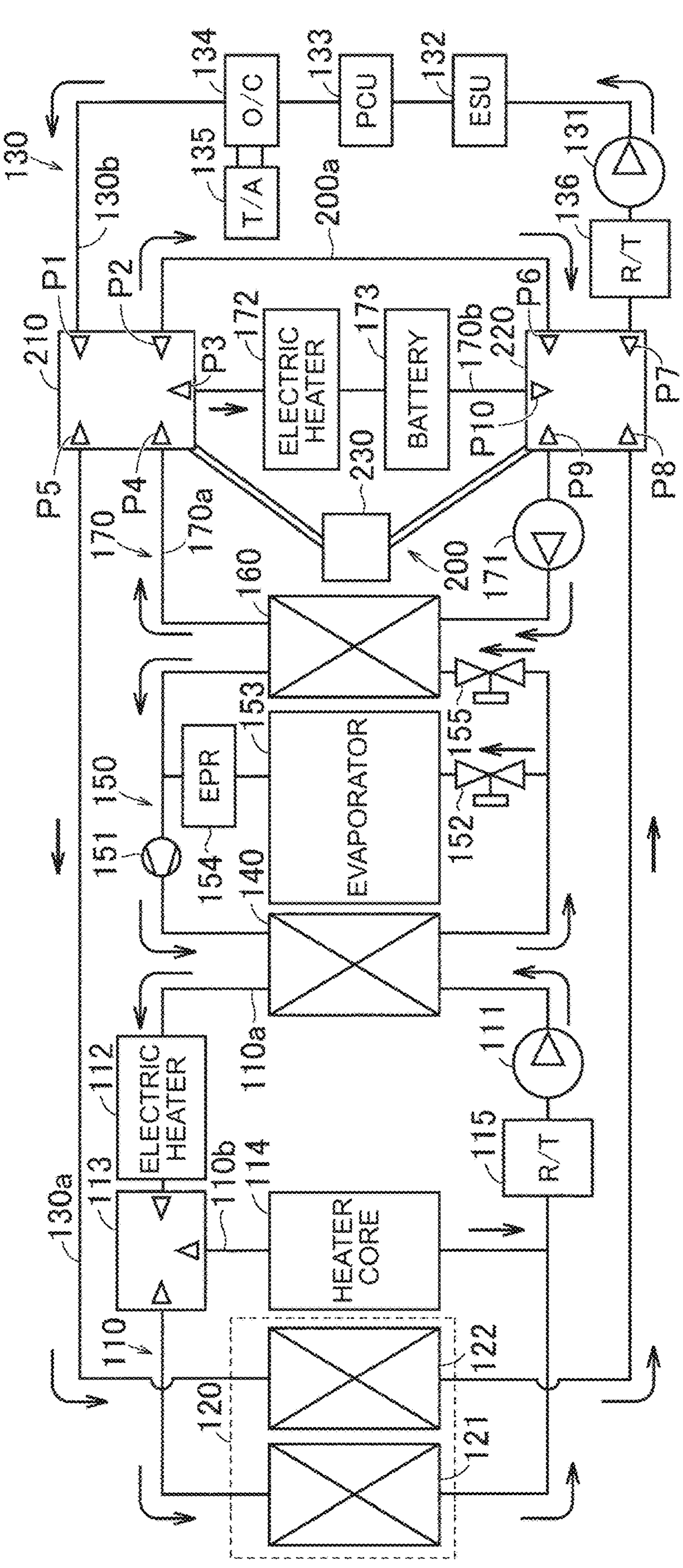
FIG. 1 is a diagram illustrating a configuration of a thermal management circuit including a switching device according to an embodiment of the present disclosure.

Hereinafter, an embodiment of the present disclosure will be described in detail with reference to the drawings. The same or corresponding parts in the drawings are designated by the same reference signs and repetitive description will be omitted.

FIG. 1 is a diagram illustrating a configuration of a thermal management circuit including a switching device according to an embodiment of the present disclosure. The thermal management circuit 1 is preferably applied to electrical equipment. An example of the electric device is an electrified vehicle equipped with a battery 173 for traveling. Electrified vehicle is, for example, battery electric vehicle (BEV). Electrified vehicle may be hybrid electric vehicle (HEV), plug-in hybrid electric vehicle (PHEV), or fuel cell electric vehicle (FCEV). However, the use of the thermal management circuit 1 in the present disclosure is not limited to a vehicle.

Overall Configuration

FIG. 1 is a diagram illustrating an overall configuration of a thermal management circuit. The thermal management circuit 1 is configured to circulate a medium (water or the like) for exchanging heat. The thermal management circuit 1 includes, for example, a high-temperature circuit 110, a radiator 120, a low-temperature circuit 130, a condenser 140, a refrigeration cycle 150, a chiller 160, a battery circuit 170, and a switching device 200.

The high-temperature circuit 110 includes a water pump (a W/P) 111, an electric heater 112, a three-way valve 113, a heater core 114, a reservoir tank (a R/T) 115, a water pump 111, an electric heater 112, a three-way valve 113, a reservoir tank 115, and a flow path 110*a* connecting the water pump 111 in this order, a three-way valve 113, a flow path 110*b* connecting the heater core 114 and the reservoir tank 115 in this order, and a heat medium (water or the like) not shown.

The water pump 111 transmits the heat medium flowing out of the reservoir tank 115 toward the electric heater 112. The electric heater 112 heats the heat medium. The heater core 114 heats air supplied to a vehicle cabin (not shown) in electrified vehicle by a heating medium. The reservoir tank 115 stores part of the heat medium flowing in the high temperature circuit 110 to maintain the pressure and amount of heat medium in the high temperature circuit 110.

As shown in FIG. 1, the high-temperature circuit 110 is provided with a high-temperature radiator 121 and a condenser 140. The high-temperature radiator 121 is provided at a part of the flow path 110*a* downstream of the three-way valve 113 and upstream of the reservoir tank 115. The high-temperature radiator 121 exchanges heat between the heat medium and the outside air. The condenser 140 is provided at a portion of the flow path 110*a* downstream of the water pump 111 and upstream of the electric heater 112. The condenser 140 exchanges heat between the heat medium and the working medium (such as water or a medium having a boiling point lower than that of water) in the refrigeration cycle 150.

The three-way valve 113 switches the flow path of the heat medium so that the heat medium flows through at least one of the first path and the second path. The first path is a path through which the heat medium circulates in this order through the water pump 111, the condenser 140, the electric heater 112, the three-way valve 113, the high-temperature radiator 121, the reservoir tank 115, and the water pump 111. The second path is a path through which the heat medium circulates through the water pump 111, the condenser 140, the electric heater 112, the three-way valve 113, the heater core 114, the 20 reservoir tank 115, and the water pump 111 in this order.

The low-temperature circuit 130 includes, for example, a water pump 131, a power supply unit (ESU) 132, a power control unit (PCU) 133, an oil cooler (a O/C) 134, a transaxle 135, a reservoir tank 136, a circulation flow path 130*a*, 130*b* connecting the water pump 131, ESU 132, PCU 133, the oil cooler 134, and the reservoir tank 136 in this order, and a heat medium (water, etc.) not shown.

The water pump 131 transmits the heat medium flowing out of the reservoir tank 136 to ESU 132. ESU 132 controls charging and discharging of the battery 173. PCU 133 converts DC power supplied from the battery 173 into AC power, and supplies the AC power to a motor (not shown) built in the transaxle 135. The oil cooler 134 circulates the 30 lubricating oil of the motor using an electric oil pump (not shown). The oil cooler 134 cools the lubricating oil by exchanging heat between the heat medium flowing in the circulation flow path and the lubricating oil. Accordingly, the transaxle 135 is cooled. ESU 132, PCU 133 and the oil cooler 134 are cooled by the thermal medium flowing through the circulation flow path. The reservoir tank 136 stores part of the heat medium flowing in the low temperature circuit 130 to maintain the pressure and amount of heat medium in the low temperature circuit 130.

As shown in FIG. 1, the low-temperature circuit 130 is provided with a low-temperature radiator 122. The low-temperature radiator 122 is provided in a portion of the circulation flow path 130*a*, 130*b* downstream of the oil cooler 134 and upstream of the reservoir tank 136. The low temperature radiator 122 is located near the high temperature radiator 121. The heat medium flowing in the low temperature radiator 122 exchanges heat with the heat medium flowing in the high temperature radiator 121. As shown in FIG. 1, the high temperature radiator 121 and the low temperature radiator 122 constitute a single radiator 120. That is, the radiator 120 is connected (i.e., shared) with both the high-temperature circuit 110 and the low-temperature circuit 130.

Refrigeration cycle 150 is connected to condenser 140 and chiller 160. The refrigeration cycle 150 includes a compressor 151, an expansion valve 152, an evaporator 153, an evaporative pressure regulator (an EPR) 154, an expansion valve 155, and a working medium (such as water or a medium having a boiling point lower than water) not shown.

The compressor 151 compresses the working medium. The condenser 140 condenses the working medium by exchanging heat between the gas-phase working medium discharged from the compressor 151 and the heat medium flowing through the high temperature circuit 110. The expansion valve 152 and the expansion valve 155 expand the working medium flowing out of the condenser 140. The evaporator 153 evaporates the working medium by exchanging heat between the working medium flowing out of the expansion valve 152 and the air supplied to the vehicle cabin of electrified vehicle. The evaporative pressure regulator 154 regulates the pressure of the working medium flowing out of the evaporator 153. The chiller 160 evaporates the working medium by exchanging heat between the working medium flowing out of the expansion valve 155 and the heat medium flowing through the battery circuit 170. The gas-phase working medium flowing out of the evaporative pressure regulator 154 and the chiller 160 flows into the compressor 151.

The battery circuit 170 includes, for example, a water pump 171, an electric heater 172, a battery 173, and a circulation flow path 170*a*, 170*b* that connects the water pump 171, the electric heater 172, and the battery 173 in this order. Note that the battery 173 is an example of a "power storage device" in the present disclosure.

The water pump 171 circulates a heat medium in the battery circuit 170. The electric heater 172 heats the heat medium circulating in the circulation flow path. The battery 173 supplies electric power for traveling to the motor contained in the transaxle. The battery 173 may be heated with the electric heater 172 or may be cooled with the chiller 160.

As shown in FIG. 1, a chiller 160 is connected to the battery circuit 170. The chiller 160 is connected to a portion of the circulation flow path 170*a*, 170*b* downstream of the water pump 171 and upstream of the electric heater 172. The chiller 160 cools the heat medium circulating in the battery circuit 170 by exchanging heat between the working medium circulating in the refrigeration cycle 150 and the heat medium circulating in the battery circuit 170.

The switching device 200 is connected to the low-temperature circuit 130 and the battery circuit 170. The switching device 200 includes a first five-way switching unit 210, a second five-way switching unit 220, a connection flow path 200*a*, and a drive unit 230.

The first five-way switching unit 210 has five ports P1 to P5. The second five-way switching unit 220 has five ports P6 to P10. In the present embodiment, each of the first five-way switching unit 210 and the second five-way switching unit 220 includes a five-way valve.

As shown in FIG. 1, the first five-way switching unit 210 is connected to a portion of the circulation flow path in the low-temperature circuit 130 downstream of the oil cooler 134 and upstream of the low-temperature radiator 122, and a portion of the circulation flow path in the battery circuit 170 downstream of the chiller 160 and upstream of the electric heater 172. The second five-way switching unit 220 is connected to a portion of the circulation flow path in the low-temperature circuit 130 downstream of the low-temperature radiator 122 and upstream of the reservoir tank 136, and a portion of the circulation flow path in the battery circuit 170 downstream of the battery 173 and upstream of the water pump 171.

When the five-way switching units 210, 220 are connected to the low-temperature circuit 130 and the battery circuit 170, the circulation flow path in the low-temperature circuit 130 is divided into a flow path 130*a* that connects the first five-way switching unit 210, the low-temperature radiator 122, and the second five-way switching unit 220 in this order, and a flow path 130*b* that connects the second five-way switching unit 220, the reservoir tank 136, the water pump 131, ESU 132, PCU 133, the oil cooler 134, and the first five-way switching unit 210 in this order. The flow path 130*b* is thermally contacted with ESU 132, PCU 133 and the oil cooler 134. The flow path 130*a* is an example of the "third flow path" in the present disclosure, and the flow path 130*b* is an example of the "second flow path" in the present disclosure.

When each of the five-way switching units 210, 220 is connected to the low-temperature circuit 130 and the battery circuit 170, the circulation flow path in the battery circuit 170 is divided into a flow path 170*a* that connects the second five-way switching unit 220, the water pump 171, the chiller 160, and the first five-way switching unit 210 in this order, and a flow path 170*b* that connects the first five-way switching unit 210, the electric heater 172, the battery 173, and the second five-way switching unit 220 in this order. The flow path 170*b* is thermally contacted with the battery 173.

The flow path 170*a* is an example of the "fourth flow path" in the present disclosure, and the flow path 170*b* is an example of the "first flow path" in the present disclosure.

The switching device 200 is capable of switching the connecting status of the flow path 170*b* (first flow path), the flow path 130*b* (second flow path), the flow path 130*a* (third flow path), and the flow path 170*a* (fourth flow path).

Figure 2:
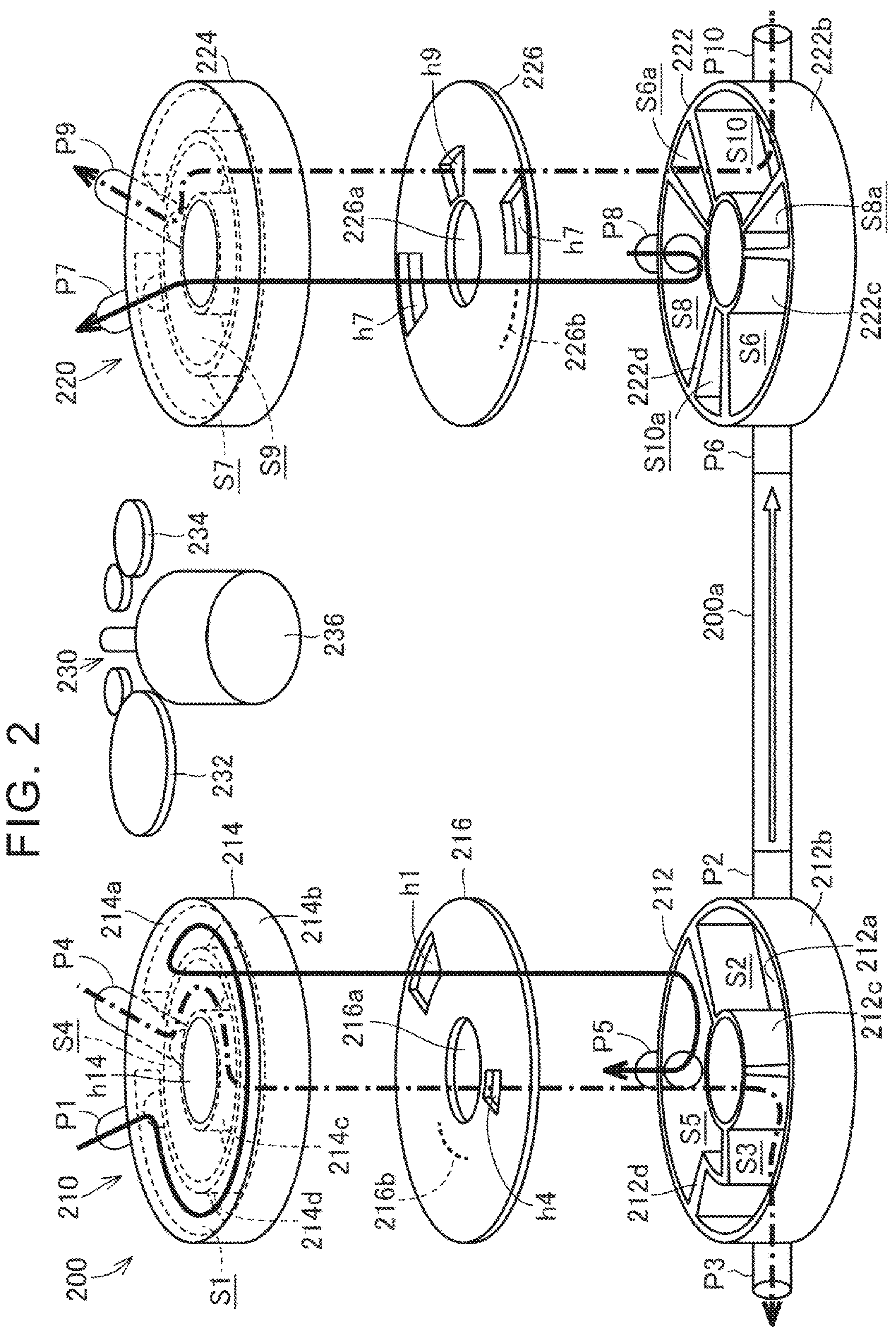
FIG. 2 is an exploded perspective view schematically showing the switching device.

FIG. 2 is an exploded perspective view schematically illustrating the switching device. As illustrated in FIG. 2, the first five-way switching unit 210 includes a bottom body 212, a top body 214, and a first switching plate 216.

The bottom body 212 has three spaces S2, S3, S5 and is shaped to open the three spaces S2, S3, S5 upward. Specifically, the bottom body 212 includes a bottom wall 212*a*, an outer peripheral wall 212*b*, an inner peripheral wall 212*c*, and a partition wall 212*d*.

The bottom-wall 212*a* is formed in a disk shape. An insertion hole through which a first shaft (not shown) is inserted is formed in a central portion of the bottom-wall 212*a*.

The outer peripheral wall 212*b* stands from a peripheral edge portion of the bottom wall 212*a*. The outer peripheral wall 212*b* is formed in a cylindrical shape. A second port P2, a third port P3, and a fifth port P5 are connected to the outer peripheral wall 212*b*.

The inner peripheral wall 212*c* is erected from a portion of the bottom wall 212*a* around the insertion hole. The inner peripheral wall 212*c* is formed in a cylindrical shape. The first shaft is inserted inside the inner peripheral wall 212*c*.

The partition wall 212*d* partitions a space between the outer peripheral wall 212*b* and the inner peripheral wall 212*c* into three spaces, namely, a second space S2, a third space S3, and a fifth space S5. The second space S2 is a space connected to the second port P2. The third space S3 is a space connected to the third-port P3. The fifth space S5 is a space connected to the fifth-port P5. The second space S2, the third space S3, and the fifth space S5 are arranged so as to be aligned in the circumferential direction of the outer peripheral wall 212*b*.

The top body 214 has two spaces S1, S4 and is configured to open the two spaces S1, S4 downward. Specifically, the top body 214 includes a top wall 214*a*, an outer peripheral wall 214*b*, an inner peripheral wall 214*c*, and a partition wall 214*d*.

The top wall 214*a* is formed in a disk shape. An insertion hole h14 through which the first shaft is inserted is formed in a central portion of the top wall 214*a*.

The outer peripheral wall 214*b* extends downward from a peripheral edge portion of the top wall 214*a*. The outer peripheral wall 214*b* is formed in a cylindrical shape. The first port P1 and the fourth port P4 are connected to the outer peripheral wall 214*b*.

The inner peripheral wall 214*c* extends downward from a portion of the top wall 214*a* around the insertion hole h14. The inner peripheral wall 214*c* is formed in a cylindrical shape. The first shaft is inserted inside the inner peripheral wall 214*c*.

The partition wall 214*d* partitions a space between the outer peripheral wall 214*b* and the inner peripheral wall 214*c* into two spaces, namely, a first space S1 and a fourth space S4. The first space S1 is a space connected to the first port P1. The fourth space S4 is a space connected to the fourth port P4. The fourth space S4 is disposed inside the first space S1 in the radial direction of the outer peripheral wall 214*b*.

The first switching plate 216 switches the connection status of the fifth port P5 from the first port P1. The first switching plate 216 is disposed between the bottom body 212 and the top body 214. The first switching plate 216 is formed in a disk shape. A shaft connecting portion 216*a* connected to the first shaft is provided at a central portion of the first switching plate 216 so as to rotate together with the first shaft while the first shaft is inserted therethrough. The first switching plate 216 is driven by the drive unit 230 via the first shaft. A recessed groove 216*b* is formed on the lower surface of the first switching plate 216.

The first switching plate 216 is formed with a first communication port h1 and a fourth communication port h4. The first communication port h1 is formed at a position of the first switching plate 216 that is connected to the first space S1. The fourth communication port h4 is formed at a position of the first switching plate 216 that is connected to the fourth space S4. The phase difference between the first communication port h1 and the fourth communication port h4 is set to 210 degrees.

The second five-way switching unit 220 includes a bottom body 222, a top body 224, and a second switching plate 226.

The bottom body 222 has six spaces S6, S6*a*, S8, S8*a*, S10, S10*a* and is shaped to open the six spaces S6, S6*a*, S8, S8*a*, S10, S10*a* upward. The structure of the bottom body 222 is similar to the structure of the bottom body 212. Specifically, the shape of the partition wall 222*d* of the bottom body 222 is different from the shape of the partition wall 212*d* of the bottom body 212. The partition wall 222*d* partitions the space between the outer peripheral wall 222*b* and the inner peripheral wall 222*c* into six spaces, that is, the sixth space S6, the tenth opposing space S10*a*, the eighth space S8, the sixth opposing space S6*a*, the tenth space S10, and the eighth opposing space S8*a*. More specifically, the partition wall 222*d* partitions a space between the outer peripheral wall 222*b* and the inner peripheral wall 222*c* such that the sixth space S6, the tenth opposing space S10*a*, the eighth space S8, the sixth opposing space S6*a*, the tenth space S10, and the eighth opposing space S8*a* are circumferentially arranged in this order. The sixth opposing space S6*a* faces the sixth space S6 with a second shaft (not shown) interposed therebetween. The eighth opposing space S8*a* faces the eighth space S8 with the second shaft interposed therebetween. The tenth opposing space S10*a* faces the tenth space S10 with the second shaft interposed therebetween. The center angle of the sixth space S6 is set to three times the center angle of the sixth opposing space S6*a*. The same applies to the eighth space S8 and the tenth space S10.

A sixth port P6 connected to the sixth space S6, an eighth port P8 connected to the eighth space S8, and a tenth port P10 connected to the tenth space S10 are connected to the outer peripheral wall 222*b*.

The top body 224 has two spaces S7, S9 and is configured to open the two spaces S7, S9 downward. The structure of the top body 224 is the same as the structure of the top body 214. A seventh port P7 connected to the seventh space S7 and a ninth port P9 connected to the ninth space S9 are connected to the outer peripheral wall 224*b*.

The second switching plate 226 switches the connection status of the tenth port P10 from the sixth port P6. The structure of the second switching plate 226 is similar to the structure of the first switching plate 216. The second switching plate 226 is formed with a shaft connecting portion 226*a*, a recessed groove 226*b* for releasing pressure, a pair of seventh communication ports h7, and a ninth communication port h9.

The seventh communication ports h7 are formed at positions of the second switching plate 226 that are connected to the seventh space S7. The phase differences between the pair of seventh communication ports h7 are set to 180 degrees. In the embodiment illustrated in FIG. 2, one of the seventh communication ports h7 communicates the seventh space S7 with the eighth space S8, and the other of the seventh communication ports h7 communicates the seventh space S7 with the eighth opposing space S8*a*. Here, the eighth space S8 and the eighth opposing space S8*a* are connected to each other via the seventh space S7, so that the seventh space S7, the eighth space S8, and the eighth opposing space S8*a* form a single space. Therefore, the heat medium flowing in from the eighth port P8 flows out from the seventh port P7. The ninth communication port h9 is formed at a position of the second switching plate 226 that is connected to the ninth space S9. The phase differences between the seventh communication ports h7 and the ninth communication port h9 are set to 90 degrees.

The connection flow path 200*a* connects the second port P2 and the sixth port P6. In the present embodiment, as shown in FIG. 2, the heat medium flows from the second port P2 toward the sixth port P6.

The drive unit 230 drives the first five-way switching unit 210 and the second five-way switching unit 220. The drive unit 230 includes a first gear portion 232, a second gear portion 234, and a single drive portion 236.

The first gear portion 232 is capable of driving the first switching plate 216. The first gear portion 232 meshes with the first shaft. That is, the first gear portion 232 can drive the first switching plate 216 via the first shaft.

The second gear portion 234 is capable of driving the second switching plate 226. The second gear portion 234 meshes with the second shaft. That is, the second gear portion 234 can drive the second switching plate 226 via the second shaft. The gear ratio of the first gear portion 232 to the second gear portion 234 is 2 or more. In the present embodiment, the gear ratio is set to 2.

The drive portion 236 drives the first gear portion 232 and the second gear portion 234. The drive portion 236 may be, for example, a motor. When the drive portion 236 is driven, the first gear portion 232 and the second gear portion 234 are driven in synchronization with each other. In the present embodiment, since the gear ratio is set to 2, when the first shaft and the first switching plate 216 are rotated by the drive portion 236 by a predetermined angle, the second shaft and the second switching plate 226 are rotated by twice the angle.

Modes

Next, a plurality of modes in the thermal management circuit 1 formed by switching the switching device 200 will be described. Switching of the switching device 200 (driving of the drive portion 236) is performed by a control unit (an ECU or the like) (not shown).

1 st Mode

Figure 3A:
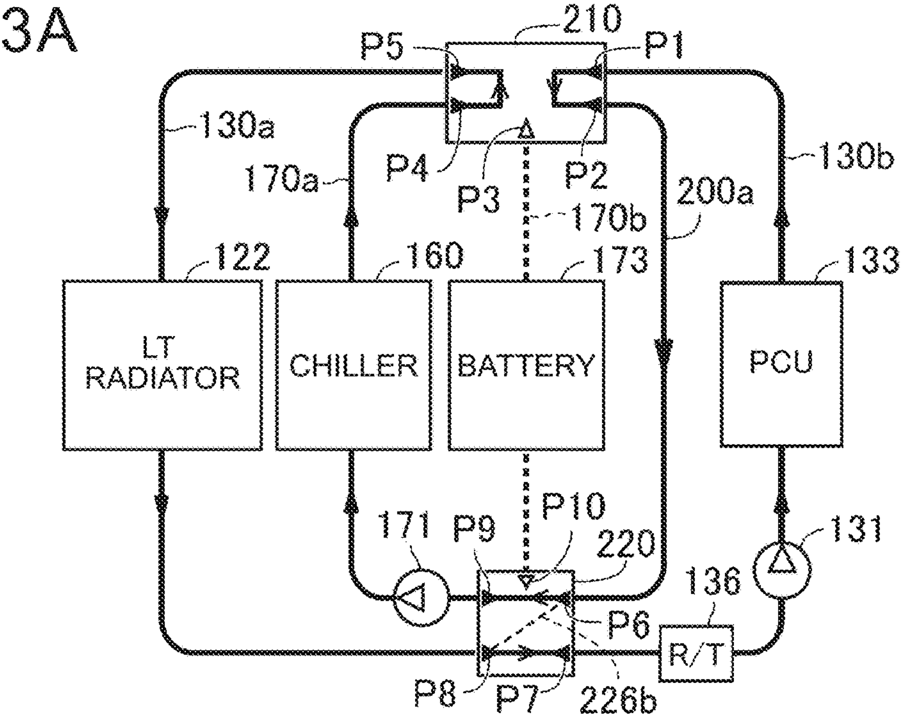
FIG. 3A is a schematic diagram of a first mode of a thermal control system.
Figure 3B:
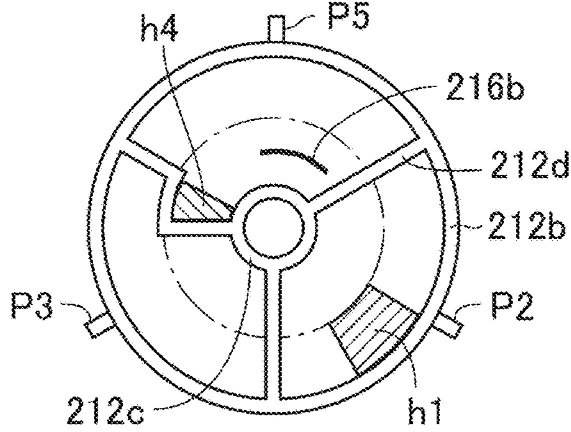
FIG. 3B is a diagram schematically illustrating a configuration of a first five-way switching unit in the first mode.
Figure 3C:
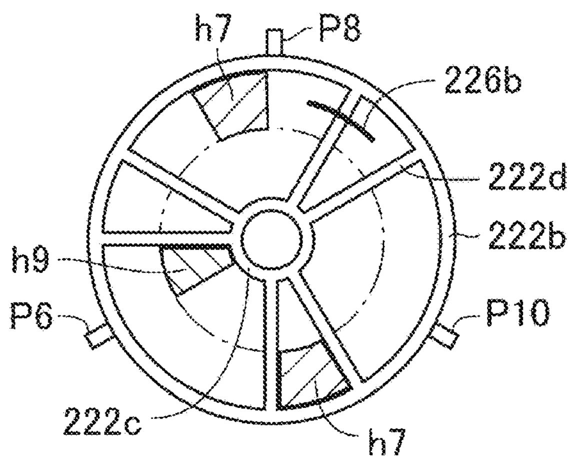
FIG. 3C is a diagram schematically illustrating a configuration of a second five-way switching unit in the first mode.

FIGS. 3A to 3C show schematically a first-mode of thermal management circuit 1 including a switching device 200. Note that the drive unit 230 is not shown in FIGS. 3A to 3C. This also applies to FIG. 4A and subsequent drawings.

As shown in FIGS. 3A to 3C, in the first mode, the first communication port h1 in the first switching plate 216 communicates the first space S1 and the second space S2, and the fourth communication port h4 communicates the fourth space S4 and the fifth space S5. The seventh communication port h7 of the second switching plate 226 communicates the seventh space S7 with the eighth space S8, and the ninth communication port h9 communicates the ninth space S9 with the sixth space S6.

In this condition, the heat medium flowing into the first space S1 from the first port P1 flows out of the second port P2 through the first communication port h1 and the second space S2. The heat medium flowing out of the second port P2 flows into the sixth space S6 from the sixth port P6 through the connection flow path 200*a*, and flows out of the ninth port P9 through the ninth communication port h9 and the ninth space S9. The heat medium flowing out of the ninth port P9 exchanges heat with the working medium flowing through the chiller 160 when the refrigeration cycle 150 is in operation, and then flows toward the fourth port P4. The heat medium flowing into the fourth space S4 from the fourth port P4 flows out from the fifth port P5 through the fourth communication port h4 and the fifth space S5. The heat medium flowing out of the fifth port P5 flows through the low-temperature radiator 122 toward the eighth port P8. The heat medium flowing into the eighth space S8 from the eighth port P8 flows out from the seventh port P7 through the seventh communication port h7 and the seventh space S7.

That is, in the first mode, as shown in FIG. 3A, a circuit in which the heat medium circulates through the flow path 130*b*, the connection flow path 200*a*, the flow path 170*a*, and the flow path 130*a* in this order is formed, and the flow path 170*b* (the battery 173) is disconnected from the circuit.

Functions in the First Mode

In the first mode, waste heat such as PCU 133 and heat (heat generation) generated by PCU 133 or the like can be used for heating the vehicle cabin in electrified vehicle by reducing the operating efficiency of PCU 133 or the like. Further, since the battery 173 is disconnected from the circuit, the battery 173 is prevented from being cooled by the heat medium flowing through the circuit, for example, during the temperature rise of the battery 173 including the self-temperature rise of the battery 173. The excess heat generated by PCU 133 or the like is discharged to the outside air in the low-temperature radiator 122. Further, the heat recovered by the low-temperature radiator 122 can be supplied to the chiller 160 (outside air heat pump).

2nd Mode

Figure 4A:
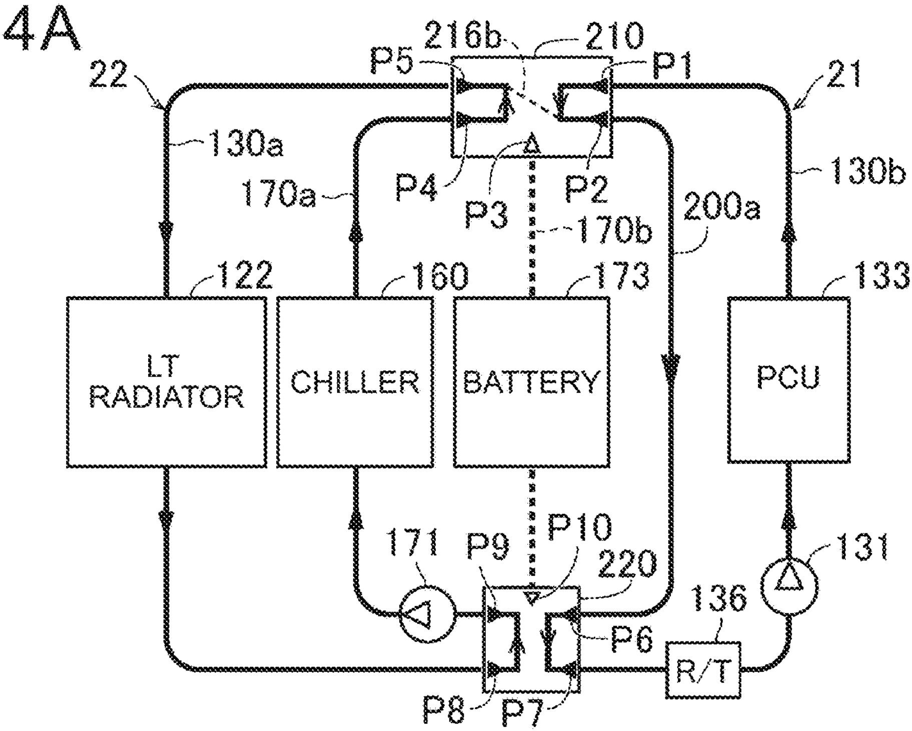
FIG. 4A is a diagrammatic view of a second mode of the thermal management circuit.
Figure 4B:
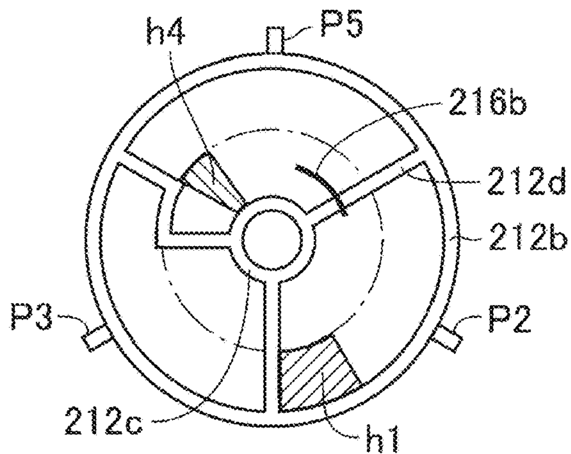
FIG. 4B is a diagram schematically illustrating a configuration of the first five-way switching unit in the second mode.
Figure 4C:
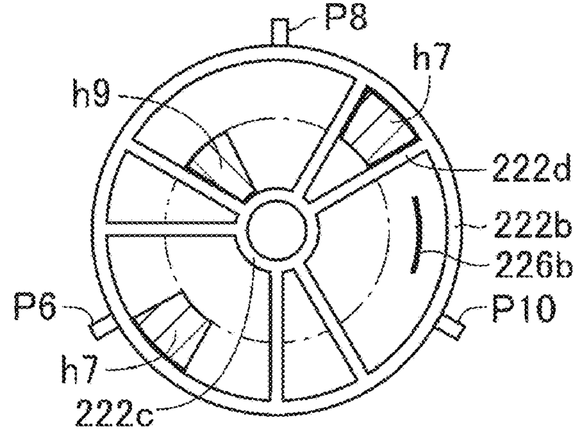
FIG. 4C is a diagram schematically illustrating a configuration of the second five-way switching unit in the second mode.

FIGS. 4A to 4C schematically illustrate a second mode of the thermal management circuit 1 including the switching device 200. As shown in FIGS. 4A to 4C, in the second mode, the first communication port h1 in the first switching plate 216 communicates the first space S1 and the second space S2, and the fourth communication port h4 communicates the fourth space S4 and the fifth space S5. The seventh communication port h7 of the second switching plate 226 communicates the seventh space S7 with the sixth space S6, and the ninth communication port h9 communicates the ninth space S9 with the eighth space S8.

In the second mode, as shown in FIG. 4A, a first circuit 21 in which the heat medium circulates in this order through the flow path 130*b* and the connection flow path 200*a*, and a second circuit 22 in which the heat medium circulates through the flow path 170*a* and the flow path 130*a* in this order are formed, and the flow path 170*b* (the battery 173) is separated from the first circuit 21 and the second circuit 22.

The first circuit 21 and the second circuit 22 communicate with each other by a recessed groove 216*b*. This communication makes the pressure of the first circuit 21 and the pressure of the second circuit 22 uniform without the heat medium passing through the recessed groove 216*b*.

Functions in the Second Mode

In the second mode, waste heat such as PCU 133 is accumulated in the heat medium in the first circuit 21, while heat recovered by the low-temperature radiator 122 is supplied to the chiller 160 (outside air heat pump) in the second circuit 22. Further, cooling of the battery 173 by the heat medium is suppressed during the temperature rise of the battery 173 including the self-temperature rise of the battery 173, for example.

3rd Mode

Figure 5A:
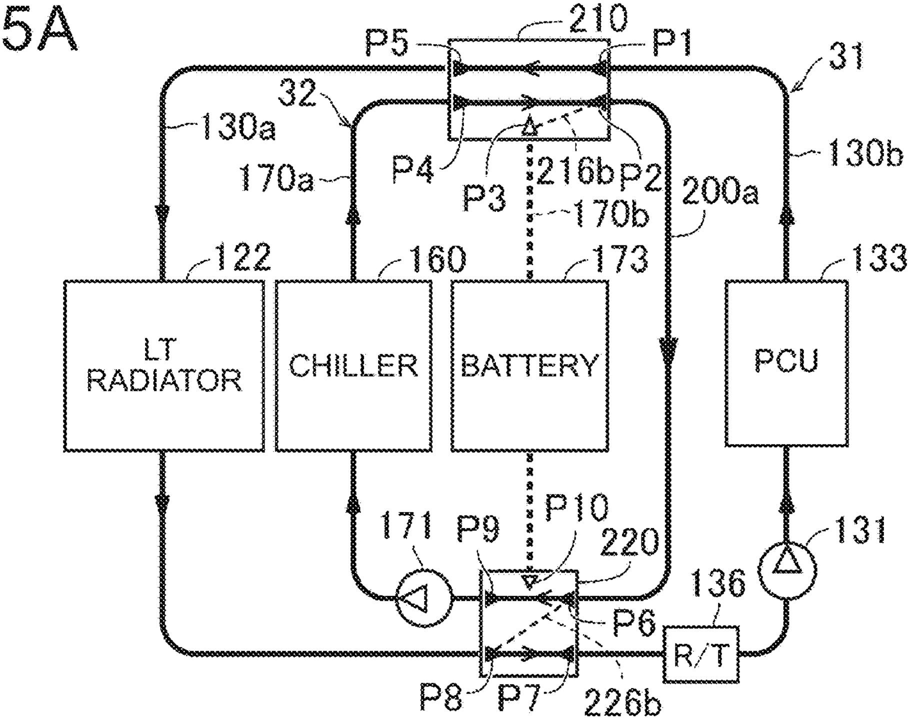
FIG. 5A is a schematic diagram of a third mode of a thermal control system.
Figure 5B:
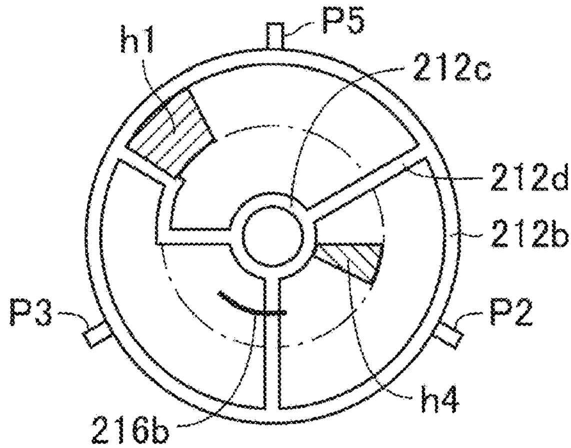
FIG. 5B is a diagram schematically illustrating a configuration of the first five-way switching unit in the third mode.
Figure 5C:
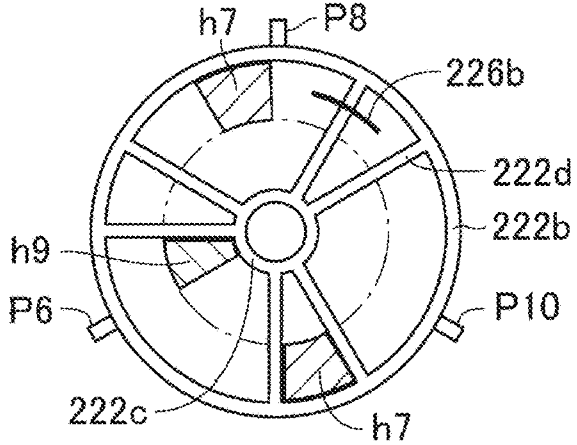
FIG. 5C is a diagram schematically illustrating a configuration of the second five-way switching unit in the third mode.

FIGS. 5A to 5C show schematically a third-mode of the thermal management circuit 1 including the switching device 200. As shown in FIGS. 5A to 5C, in the third mode, the first communication port h1 in the first switching plate 216 communicates the first space S1 and the fifth space S5, and the fourth communication port h4 communicates the fourth space S4 and the second space S2. The seventh communication port h7 of the second switching plate 226 communicates the seventh space S7 with the eighth space S8, and the ninth communication port h9 communicates the ninth space S9 with the sixth space S6.

In the third mode, as shown in FIG. 5A, a first circuit 31 in which a heat medium circulates in the flow path 130*a* and the flow path 130*b* in this order, and a second circuit 32 in which a heat medium circulates in the flow path 170*a* and the connection flow path 200*a* in this order are formed, and the flow path 170*b* (the battery 173) is separated from the first circuit 31 and the second circuit 32.

Functions in the Third Mode

In the third mode, in the first circuit 31, waste heat such as PCU 133 is discharged by the low-temperature radiator 122, and the cooling of the battery 173 by the heat medium is suppressed during the temperature rise of the battery 173 including the self-temperature rise of the battery 173, for example. In the third mode, the water pump 171 may be stopped.

4th Mode

Figure 6A:
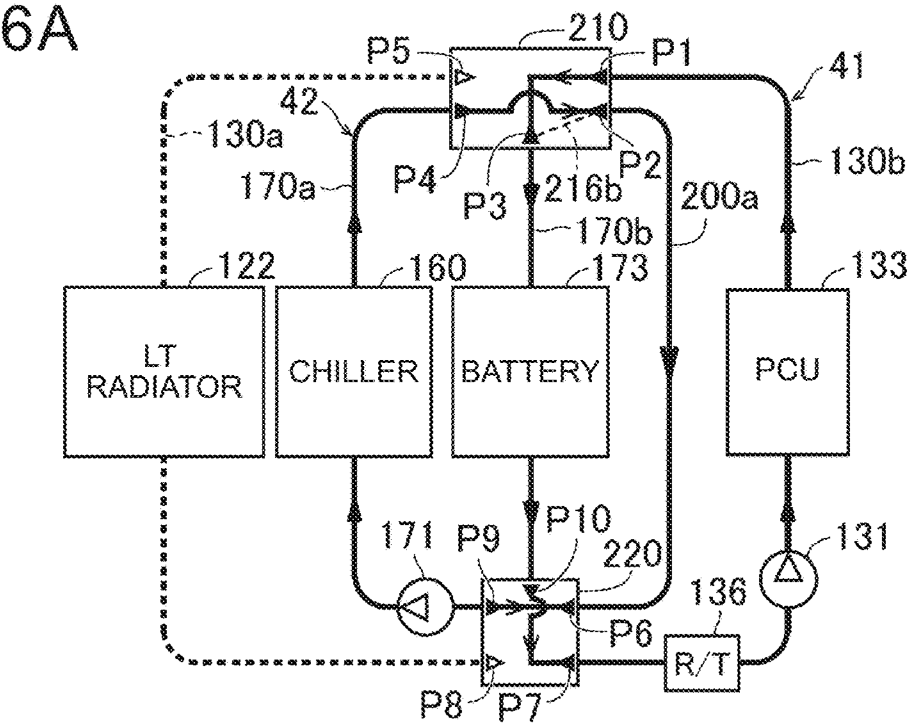
FIG. 6A is a schematic diagram of a fourth mode of a thermal control system.
Figure 6B:
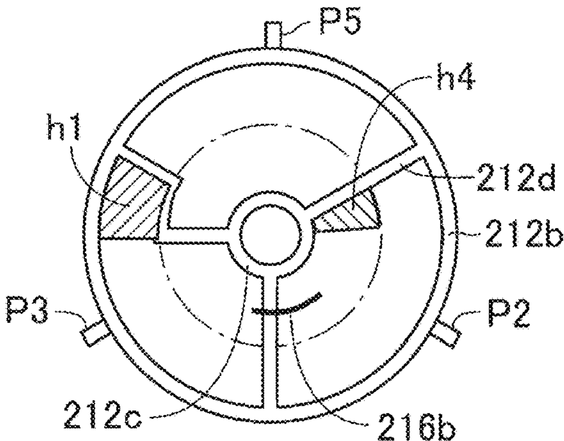
FIG. 6B is a diagram schematically illustrating a configuration of the first five-way switching unit in the fourth mode.
Figure 6C:
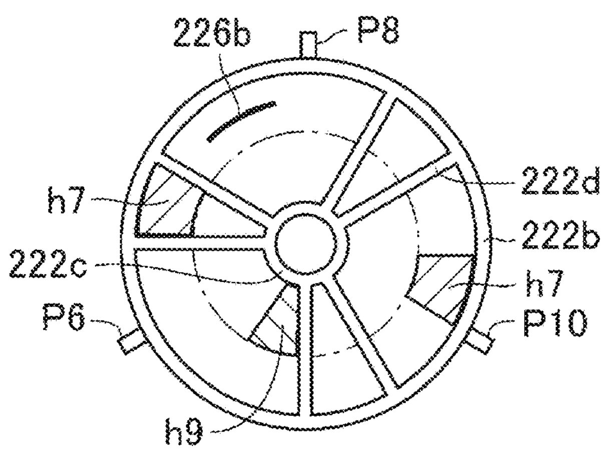
FIG. 6C is a diagram schematically illustrating a configuration of the second five-way switching unit in the fourth mode.

FIGS. 6A to 6C schematically illustrate a fourth mode of the thermal management circuit 1 including the switching device 200. As shown in FIGS. 6A to 6C, in the third mode, the first communication port h1 in the first switching plate 216 communicates the first space S1 and the third space S3, and the fourth communication port h4 communicates the fourth space S4 and the second space S2. The seventh communication port h7 of the second switching plate 226 communicates the seventh space S7 with the tenth space S10, and the ninth communication port h9 communicates the ninth space S9 with the sixth space S6.

In the fourth mode, as shown in FIG. 6A, a first circuit 41 in which a heat medium circulates in the flow path 130*b* and the flow path 170*b* in this order, and a second circuit 42 in which a heat medium circulates in the flow path 170*a* and the connection flow path 200*a* in this order are formed, and the flow path 130*a* (low-temperature radiator 122) is separated from the first circuit 41 and the second circuit 42.

Functions in the Fourth Mode

In the fourth mode, in the first circuit 41, waste heat such as PCU 133 is used for raising the temperature of the battery 173, and waste heat such as PCU 133 is suppressed from being released by the low-temperature radiator 122. In the fourth mode, the water pump 171 may be stopped.

5th Mode

Figure 7A:
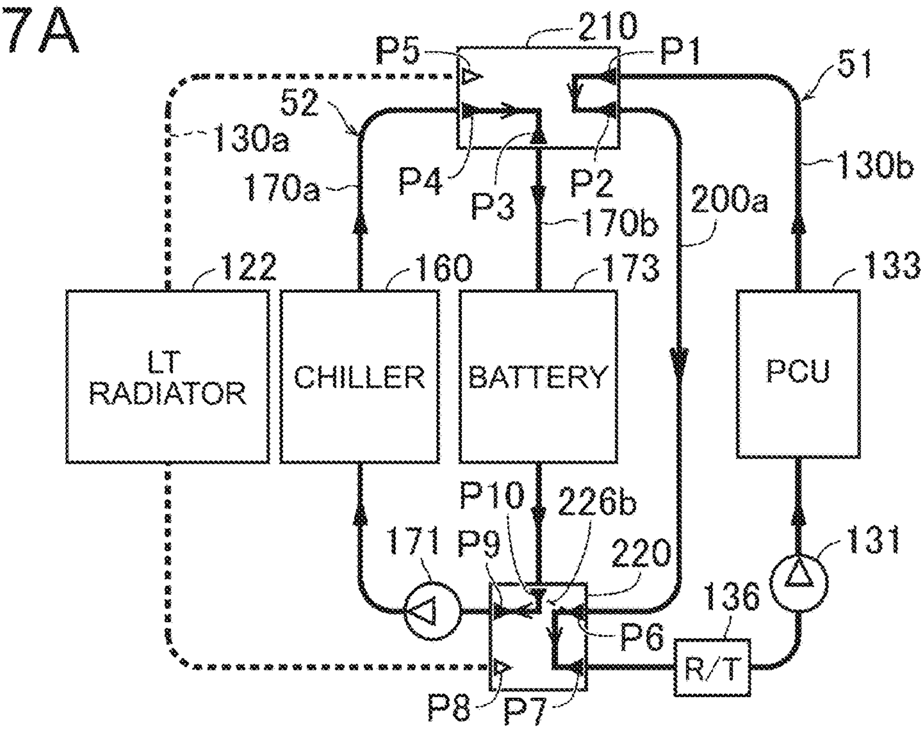
FIG. 7A is a schematic diagram of a fifth mode of a thermal control system.
Figure 7B:
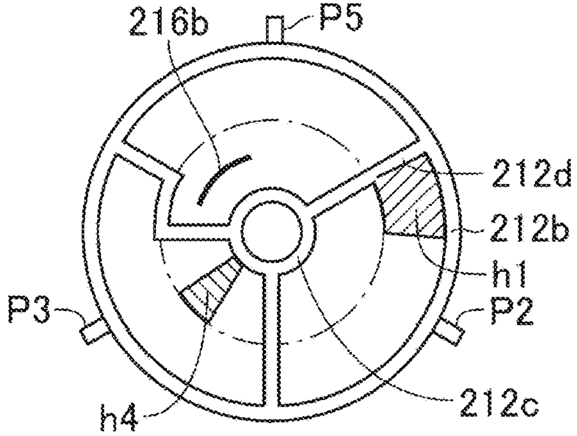
FIG. 7B is a diagram schematically illustrating a configuration of the first five-way switching unit in a fifth mode.
Figure 7C:
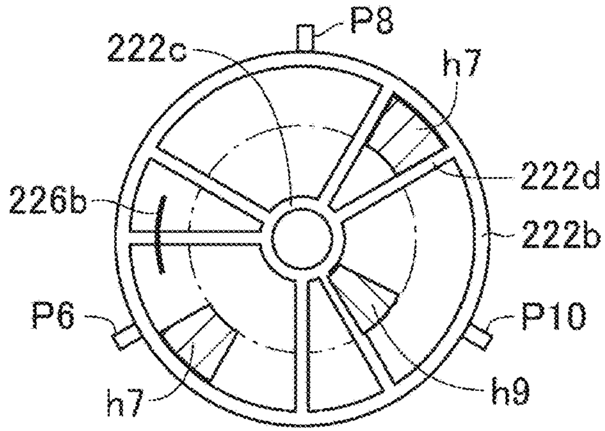
FIG. 7C is a diagram schematically showing the configuration of the second five-way switching unit in the fifth mode.

FIGS. 7A to 7C schematically illustrate a fifth mode of the thermal management circuit 1 including the switching device 200. As shown in FIGS. 7A to 7C, in the fifth mode, the first communication port h1 in the first switching plate 216 communicates the first space S1 and the second space S2, and the fourth communication port h4 communicates the fourth space S4 and the third space S3. The seventh communication port h7 of the second switching plate 226 communicates the seventh space S7 with the sixth space S6, and the ninth communication port h9 communicates the ninth space S9 with the tenth space S10.

In the fifth mode, as shown in FIG. 7A, a first circuit 51 in which the heat medium circulates in this order through the flow path 130*b* and the connection flow path 200*a*, and a second circuit 52 in which the heat medium circulates through the flow path 170*a* and the flow path 170*b* in this order are formed, and the flow path 130*a* (the low-temperature radiator 122) is separated from the first circuit 51 and the second circuit 52. Functions in Mode 5

In the fifth mode, in the first circuit 51, waste heat such as PCU 133 is accumulated in the heat medium, while in the second circuit 52, heat generated in the battery 173 is discharged by the chiller 160. In addition, heat dissipation in the low-temperature radiator 122 is suppressed.

Other Modes

Although not shown, the switching device 200 can switch the thermal management circuit 1 to a mode different from the above-described modes. Such modes include, for example, the following modes.

6th Mode

In the sixth mode, the first communication port h1 in the first switching plate 216 communicates the first space S1 with the fifth space S5, and the fourth communication port h4 communicates the fourth space S4 with the third space S3. The seventh communication port h7 of the second switching plate 226 communicates the seventh space S7 with the eighth space S8, and the ninth communication port h9 communicates the ninth space S9 with the tenth space S10.

Functions in Mode 6

In the sixth mode, for example, waste heat such as PCU 133 is discharged by the low-temperature radiator 122, and heat generated by the battery 173 is discharged by the chiller 160.

7th Mode

In the seventh mode, the first communication port h1 in the first switching plate 216 communicates the first space S1 with the second space S2, and the fourth communication port h4 communicates the fourth space S4 with the third space S3. The seventh communication port h7 of the second switching plate 226 communicates the seventh space S7 with the tenth space S10, and the ninth communication port h9 communicates the ninth space S9 with the sixth space S6.

Functions in Mode 7

In the seventh mode, for example, waste heat such as PCU 133 and heat generated in the battery 173 are emitted by the chiller 160. In addition, when the refrigeration cycle 150 is not in operation, waste heat such as PCU 133 can be used to raise the temperature of the battery 173.

8th Mode

In the eighth mode, the first communication port h1 in the first switching plate 216 communicates the first space S1 with the third space S3, and the fourth communication port h4 communicates the fourth space S4 with the fifth space S5. Further, the seventh communication port h7 in the second switching plate 226 communicates the seventh space S7 with the tenth space S10, and the ninth communication port h9 communicates the ninth space S9 with the eighth space S8.

Functions in Mode 8

In the eighth mode, for example, waste heat such as PCU 133 can be used to raise the temperature of the battery 173. In addition, it is possible to supply the heat recovered by the low-temperature radiator 122 to the chiller 160 (outside air heat pump).

9th Mode

In the ninth mode, the first communication port h1 in the first switching plate 216 communicates the first space S1 with the third space S3, and the fourth communication port h4 communicates the fourth space S4 with the fifth space S5. The seventh communication port h7 of the second switching plate 226 communicates the seventh space S7 with the eighth space S8, and the ninth communication port h9 communicates the ninth space S9 with the tenth space S10.

Functions in Mode 9

In the ninth mode, for example, waste heat such as PCU 133 and heat generated in the battery 173 are emitted by the chiller 160 and the low-temperature radiator 122. Further, heat recovered by the low-temperature radiator 122, waste heat such as PCU 133, and heat generated by the battery 173 can be supplied to the chiller 160 (outside air heat pump).

As described above, in the switching device 200 according to the present embodiment, since the gear ratio of the first gear portion 232 to the second gear portion 234 is 2, the combination of the phases of the switching plates 216, 226 increases. Therefore, the number of modes that can be switched by the single drive portion 236 is secured.

In the switching device 200, the first five-way switching unit 210 and the second five-way switching unit 220 may be provided in a single housing. The connection flow path 200*a* may be formed by a channel or a channel provided in the housing.

It will be understood by those skilled in the art that the exemplary embodiments described above are specific examples of the aspects described below.

First Aspect

A switching device that can be provided in a thermal management circuit, comprising:

a first five-way switching unit, a second five-way switching unit,

A drive unit for driving the first five-way switching unit and the second five-way switching unit, The first five-way switching unit includes a first switching plate, The second five-way switching unit includes a second switching plate, The drive unit, A first gear portion capable of driving the first switching plate, A second gear portion capable of driving the second switching plate, A drive portion for driving the first gear portion and the second gear portion, The switching device, wherein a gear ratio of the first gear portion to the second gear portion is equal to or greater than 2.

In this switching device, since the gear ratio of the first gear portion to the second gear portion is larger than 2, the combination of the phases of the respective switching plates increases. Therefore, the number of modes that can be switched by a single drive portion (such as a motor) is secured.

Second Aspect

A thermal management system provided in an electric device, the thermal management system comprising:

A switching device according to aspect 1,

- a first flow path, a second flow path, a third flow path, and a fourth flow path each configured to allow a heat medium to flow through the flow path;
- a power storage device configured to exchange heat with the heat medium flowing through the first flow path;

a drive device configured to exchange heat with the heat medium flowing through the second flow path and supply a driving force to the electric device;

a radiator provided in the third flow path;

A chiller provided in the fourth flow path,

The first five-way switching unit and the second five-way switching unit in the switching device, the first flow path, the second flow path, the third flow path and the fourth flow path can be switched connection state.

The embodiments disclosed herein should be considered as illustrative and not restrictive in all respects. The scope of the present disclosure is shown by the claims rather than the above embodiments, and also includes all modifications within the meaning and the scope equivalent to those of the claims.

What is claimed is:

1. A switching device that is able to be provided in a thermal management circuit, the switching device comprising:

a first five-way switching unit;

a second five-way switching unit; and a drive unit that drives the first five-way switching unit and the second five-way switching unit, wherein:

the first five-way switching unit includes a first switching plate;

the second five-way switching unit includes a second switching plate;

the drive unit includes a first gear that drives the first switching plate, a second gear that drives the second switching plate, and a motor that drives the first gear and the second gear; and a gear ratio of the first gear to the second gear is two or more.

2. A thermal management system provided in an electric vehicle the thermal management system comprising:

the switching device according to claim 1;

a first flow path, a second flow path, a third flow path, and a fourth flow path each configured to allow a heat medium to flow through the first to fourth flow paths;

a battery that exchanges heat with the heat medium flowing through the first flow path;

a motor provided in a transaxle that exchanges heat with the heat medium flowing through the second flow path and supplies a driving force to the electrical device;

a radiator provided in the third flow path; and a chiller provided in the fourth flow path, wherein the first five-way switching unit and the second five-way switching unit in the switching device switch a connection state between the first flow path, the second flow path, the third flow path, and the fourth flow path.

* * * * *